United States Patent [19]
Hall et al.

[11] Patent Number: 5,398,131
[45] Date of Patent: Mar. 14, 1995

[54] STEREOSCOPIC HARDCOPY METHODS

[76] Inventors: Dennis R. Hall, 7075 SW. Hoodview Pl., Beaverton, Oreg. 97005; Philip A. Johnson, 7045 SW. 240th Pl., Beaverton, Oreg. 97007

[21] Appl. No.: 929,673

[22] Filed: Aug. 13, 1992

[51] Int. Cl.$^6$ ............................................. G02B 27/22
[52] U.S. Cl. ...................................... 359/465; 359/462
[58] Field of Search ............... 359/462, 463, 464, 465

[56] References Cited

U.S. PATENT DOCUMENTS 5,050,961 10/1991 Venolia .............................. 350/132

OTHER PUBLICATIONS

Sades Faris, "Micro-Polarizer Arrays Applied to a New Class of Stereoscopic Imaging" SID 91 Digest, 1991, pp. 840–843.

Martin Schadt, Jurg Funfschilling, "Novel Polarized Liquid-Crystal Color Projection and New TN-LCD Operating Modes", SID 90 Digest, 1990, pp. 324–326.

Robert Maurer et al., "Polarizing Color Filters Made From Cholesteric LC-Silicones", SID 90 Digest, 1990, pp. 110–113.

*Primary Examiner*—Scott J. Sugarman
*Attorney, Agent, or Firm*—Smith-Hill and Bedell

[57] ABSTRACT

A full color stereoscopic hard copy is printed using a first group of color inks that reflect one handedness of circularly polarized light and a second group of color inks that reflect the opposite handedness of circularly polarized light. One image of a stereo pair is printed using the first group of inks and the other of the stereo pair is printed using the second group of inks.

31 Claims, 5 Drawing Sheets

STEREOSCOPIC HARDCOPY METHODS

BACKGROUND OF THE INVENTION

This invention relates to stereoscopic (stereo) hardcopy image generation and viewing methods, and mainly to methods for producing said hardcopy from a computer controlled printer. This application is related to Disclosure Document 260862 filed in the Patent and Trademark Office on Aug. 16, 1990. The contents of Disclosure Document 260862 are hereby incorporated by reference herein.

Computer-based workstations that are currenfiy available provide a display to the user on a display monitor. Some workstations that are currently available display a full color, high quality, stereoscopic image to a user who is equipped with appropriate glasses for discriminating two stereo perspective views (SPVs) generated by the display monitor. Typically, the display monitor operates so that the left eye SPV is displayed with left-handed circularly polarized light (CPL) and the right eye SPV is displayed with right-handed CPL, and the left lens of the user's glasses transmit only left-handed CPL and the right lens transmits only right-handed CPL.

The image that is displayed on the monitor of a workstation is ephemeral. If a particular image is to be preserved, it is necessary to make a hardcopy of the image. Such a hardcopy is generated by use of a printer that is connected to the workstation. Printing technologies that are in common usage for graphics and imaging do not generate stereoscopic images, and accordingly the hardcopy generated by a workstation printer is monoscopic in nature. There are six printer technologies in common usage for graphics and imaging: The impact printers (Dot Matrix, Daisy Wheel, etc.), the ink jet printers, the phase change printers, the laser printers, the thermal wax printers and the dye sublimation printers.

The impact printers use hammers to transfer ink from a ribbon to the print medium. The Dot Matrix printers use, as the name implies, a matrix of dots to form print characters and other print detail whereas the Daisy Wheel and related printers, transfer entire characters from the ribbon to the media. It is usual for these printers to print only in black or a single color and the writing speed is slow.

The ink jet printer has become very popular because of its high quality prints and modest costs, particularly regarding color. These printers squirt a droplet of ink through an orifice onto the print medium to form a written dot and through a process of connecting the dots, write characters and other print detail. There are two basic methods of squirting the ink in these machines. The first is the piezoelectric driver, where a piezoelectric material produces a mechanical motion or displacement in the ink jet cavity when driven by an electrical pulse. This displacement pressurizes the cavity and thus pushes an ink droplet through the cavity orifice and onto the print medium. The second method uses a minute heating element to vaporize a small amount of the ink in the ink jet cavity, thus pressurizing the cavity and squirting ink through the ink jet orifice onto the medium. Depending upon the degree of ink jet multiplexing used, these printers vary from having slow to moderate writing speeds.

The third printer technology is Phase Change Printing (PCP), where a solid (colored wax) is heated until it melts and then this ink is deposited by basic ink jet methods (piezoelectric divers). The warm wax is then pressed into the print medium with a roller. The print quality of these printers is excellent and because of a high degree of printhead multiplexing, the writing speed is also very good.

The technology of the laser printer is well documented. In general the process consists of negatively charging a photosensitive drum and then, when one or more light beams (laser or LED) strikes (writes) the drum, the written areas become positively charged and when exposed to a negatively charged plastic toner powder, the toner is transferred to the positively charged areas on the drum, then, positively charged paper is passed by the drum, attracting the toner powder to the paper which is then passed through heated rollers to fuse the toner onto the paper. Color laser printers use essentially the same process, which is repeated four times for the colors of cyan, magenta, yellow and black, and the toners are not fused until after all the toners are deposited. Laser printers offer excellent print quality and writing speed.

The thermal wax printer uses a ribbon with page size areas of cyan, magenta and yellow wax layers upon it. Black wax areas are sometimes also used. The colored areas of the ribbon sequentially overlay the print medium, whereupon wax from the ribbon is transferred to the medium by heating the wax in the areas where the transfer is to be performed. This process is very wasteful of printing consumables. The print quality is excellent, while the printing speed is slow.

The dye sublimation print process is essentially the same as the thermal wax process, other than the fact that a dye, rather than a wax, is transferred from the ribbon to the medium by vaporization rather than melting.

None of the computer printing systems thus far discussed have the ability to rapidly create a high quality color hardcopy of the stereoscopic display from a computer terminal or workstation.

However stereo hardcopy is possible by the archaic methods of the anaglyph, Vectograph ® and prismatic technologies, including the parallax barrier.

The anaglyph is the familiar two color (commonly cyan & red) stereo method of the movies and print media. These can be easily generated on the existing computer printers, but the anaglyphs lack color integrity and the glasses which must be worn, are not compatible with the glasses worn for the computer's stereo display, nor are they cosmetically appealing.

Vectograph ® is a product of Polaroid Corporation and consists of stretched PVA layers, oriented orthogonally on each side of a transparent supporting medium. The stretched PVA layers will form orthogonal linear polarizers when treated with certain iodine salts. An ink is made of potassium iodine (KI) desolved in water and a Stereo Perspective View (SPV) is printed on each side of the Vectograph with this ink. This printing is usually done using photolithographic type film (Kodak Matrix Film Type 4150 or Polaroid Vectograph Film R-1), which is soaked in the ink, drained and then impressed upon the Vectograph with rollers. Steps are then taken to fix and preserve the images. The result of this process is black & white stereo hardcopy when viewed through linearly polarizing glasses, having orthogonally oriented polarizing lenses. If a quarter wave plate with its optical axis at 45 deg. to the polarization axes, is placed over the Vectograph, circular polarizing glasses of the type worn to view the stereo display of a workstation can be used. Color Vectographs can also be made by repeating this process three times with filters used in exposing the photolithographic film and using polarizing color dyes to treat the Vectograph layers. And while the results of all this processing can be impressive, it does not lend itself to the timely generation of hardcopy from a computer terminal or workstation.

Prismatic techniques have been greatly refined over a period of forty or more years. This technique consists of covering the hardcopy medium with a linear array of lenticular lenslets or minute refracting prisms, such that when a given lenslet is viewed with left and right eyes a viewer sees information coming from differing areas of the hardcopy, due to the lens action and the lateral separation of the eyes. In this way, when the individual eyes are properly located relative to the hardcopy and the individual lenslets, a stereoscopic view can be presented to the viewer and if there is sufficient resolution in the hardcopy many SPVs can be presented as the viewer moves his head or rotates the hardcopy, thus allowing the impression of a true three dimensional display where the viewer can "look behind" objects in the foreground. Another advantage of the prismatic hardcopy is that it is autostereoscopic (requiring no glasses).

The parallax barrier is very similar to the prismatic hardcopy with the exception that rather than lenslets the barrier technique sets opaque stripes some small distance away from the printed surface, so that when the gaps between the stripes are viewed, each eye perceives a different portion of the printed surface and if this surface is printed such that each eye sees one of a stereo pair of images, the viewer will sometimes be able to fuse these images and perceive a stereoscopic display. The poor resolution and exacting registration requirements render the prismatic and the parallax barrier techniques unsuitable for computer generated hardcopy.

Thus, none of these hardcopy technologies will yield a high quality, color hardcopy from a standard or slightly modified computer printer.

SUMMARY OF THE INVENTION

This problem is solved by the use of special inks to be used in said printers. The special inks utilize cholesteric LC's. These materials are now more commonly called Chiral Nematic LC's (CN-LC's). They have the physical property that depending upon the direction and rate of twist (pitch) of the molecules in the LC structure, they will reflect one color and handedness of CPL, while transmitting all other colors and handednesses of the incident light, so that this light may subsequently interact with other species of the LC, i.e. those having different reflective color and/or handedness, cf. Ref. Schadt, et al. Thus, in one of the simplest configurations of the stereo hardcopy method, two printers are used, one using Right Hand (RH) CN-LC inks, i.e. LC inks that reflect RHCPL, and the other printer using Left Hand (LH) CN-LC inks. The printer using the RH LC inks will print the Right Eye (RE) SPV on a sheet of black media and the printer using the LH LC inks will print the Left Eye (LE) SPV on the same sheet, superimposed on RE's SPV. Then by convention, the viewer wears glasses whose right lens transmits only RHCPL and the left lens transmits only LHCPL so that when viewing this printed sheet, the RE sees only the RE SPV and the LE sees the LE SPV, whereupon most viewers will fuse these images in their brain and perceive a single stereoscopic image. Thus, through the use of these LC inks, high quality, full color, stereoscopic hardcopy can be quickly and easily generated from, as will be shown, standard or slightly modified computer printers. Additionally, by using the LC inks in the subtractive rather than the additive mode, transparencies for direct view or projection use can also be made by these methods. These LC inks will also find application in non stereoscopic printing, stereoscopic photography and other stereo hardcopy techniques.

DESCRIPTION OF THE PREFERRED EMBODIMENTS

Figure 1:
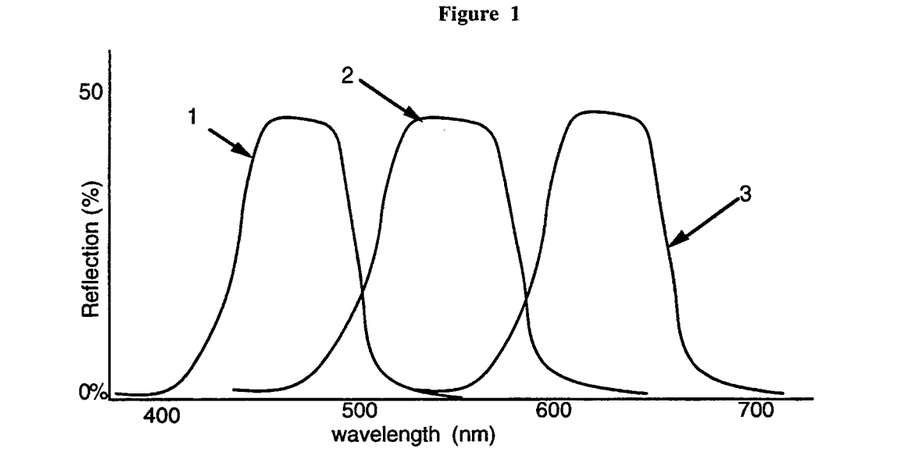
FIG. 1 is an illustration of the spectral response of CN-LC materials that are generally available from LC suppliers.

In FIG. 1, the spectral distributions for a family of LC inks (1,2&3) are illustrated. These distributions were selected so that the combination of the LC inks will produce a white color in the reflective mode or a black in the transmission mode, i.e. where the combination of the inks will reflect all the light of one/or both handednesses incident upon them. A very acceptable white in the reflective mode can be obtained without reflecting all the incident light, but these same inks will yield a washed-out or low contrast black in the transmission mode. There is no specific number of required LC inks, although in the reflective mode, two narrow band inks of each handedness are a minimum to create white and three inks of each handedness are required to obtain white and most reasonably saturated colors. As more inks are added, the gamut of colors increases only little. The gamut of unsaturated colors can be greatly increased by the addition of a transparent, nonscattering, black ink, which need not be a LC ink at all, but rather a neutral density or specular filter to be selectively introduced to mute or diminish the saturation of individual or collective LC inks. This is generally applicable in the reflective mode only, where the colors to be most muted are printed first with some amount of the transparent black printed over these colors and the most brilliant colors to be printed last. This form of printing requires at least seven inks, which are three color inks of two handednesses and a neutral density filter ink (black), but this has the ability to yield a complete color gamut. Using inks and filters serially as described, greatly increases the resolution relative to most printing methods, where the resolution is degraded by dithering to increase the color gamut. But the serial use of inks requires near perfect registration in the application of the ink and filter layers which is not practical with many printing methods.

The LC inks may be formulated in many different ways depending upon the deposition method to be used, but all methods must provide some means of establishing and orienting the LC structure, so that the axis of twist of the structure is directed generally toward the viewer. In this orientation the viewer observes the Grandjean state of the LC. Most frequently LC's are oriented by an "alignment layer" on a substrate, but since this would generally necessitate the incorporation and maintenance of an alignment layer on the print media, other means are preferred in obtaining the necessary alignment of the LC inks in most applications. The preferred inks for most applications are the microencapsulated LC inks, where the LC's are encapsulated in about 2 to 6 micron elastomer spheres and the microcapsules are suspended in a somewhat volitile media. There is no apparent means of orientation of the capsules or the LC within them, but, upon drying the ink shrinks to about 50% of its wet volume and it is at this time that the LC within the microcapsules becomes oriented or aligned. The reason for this is not totally understood, but the cause appears to be both physical and chemical. Physically the shrinking of the ink film seems important and it is believed that since the shrinkage occurs primarily in the thickness of film, this stresses and distorts the microcapsules to some degree, and if the microcapsule wall contains long molecules which tend to align under this action, then the LC will align with these molecules.

Another promising LC ink is one developed by Wacker Chemie GmbH of Munchen (Munich), Germany. The company identifies these materials as "Crosslinkable Cholesteric LC-Silicones" (CCLC-S). These inks become highly liquid only at somewhat elevated temperatures (60 to 90 deg. C.), which Wacker Chemie refers to as the "activation temperature". This is also the temperature at which the material assumes its LC properties and at which the alignment of the LC must be performed, after which the LC can be made into solid films by either a photo or thermal set process, when suitable agents are added to the material, cf. Ref. Maurer, et al.

A third form of LC ink is the basic CN-LC material itself. However, this ink has very limited application, since it will not dry and can not be layered. But for some temporary, single color and single handedness per written page, applications this material can be used as an ink when placed on a substrate having an alignment layer or sandwiched between transparent sheets. Some success has also been obtained by mixing the basic LC in a plastic carrier, such as Dupont's "Elvanol ®" (PVA) where it behaves somewhat like the microencapsulated LC inks.

Figure 2:
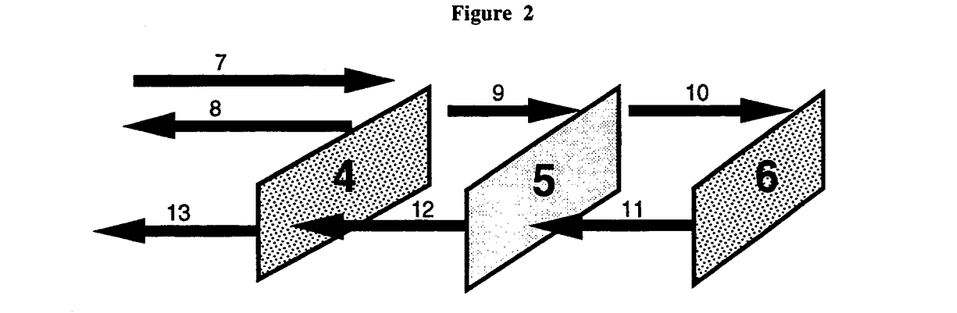
FIG. 2 illustrates how a halfwave plate can be used with CN-LC inks of only one handedness to produce stereo hardcopy encoded with both handednesses of CPL.

FIG. 2 illustrates a stereo printing method that uses LC inks of the same handedness. This technique not only greatly simplifies the printer hardware, but also assures excellent color matching of the inks in the two SPVs. The technique consists of separating the SPVs by placing a halfwave plate between them. In the drawing, the incoming unpolarized light (7) strikes a transparency (4) having the left eye's SPV written upon it with left hand circular polarizing LC inks, which convert the unpolarized light (7) into LHCPL (8) which it reflects and RHCPL (9), which it transmits on to a halfwave plate (5). The halfwave plate (5) converts the RHCPL (9) to LHCPL (10), which proceeds to the SPV for the right eye(6) which is also written with left hand circularly polarizing LC inks, which reflect LHCPL (11) back through the halfwave plate (5). The halfwave plate converts the LHCPL (11) to RHCPL (12) which passes through the first transparency (4) unaffected, and thus the viewer sees one view (4) with LHCPL (8) and the other view (6) with RHCPL (13). The light not used in reflection from both SPVs is passed out the right side of the illustration if the second SPV (6) is printed upon a transparent medium. This is the transmission mode and it yields a color negative of the stereo views (4&6), in the opposite handedness of CPL from that found in the reflected views. It might be noted that the halfwave plate need not be a single plate but possibly a number of wave plates adding up to a halfwave plate, e.g. two quarter wave plates, and there may also by any number of full wave plates used in addition to the halfwave plate, e.g. 3/2 wave, 5/2 wave, --- (n+½) wave plate. And the SPVs (4 & 6) can also be printed directly upon the surfaces of the halfwave plate (5).

Figure 3:
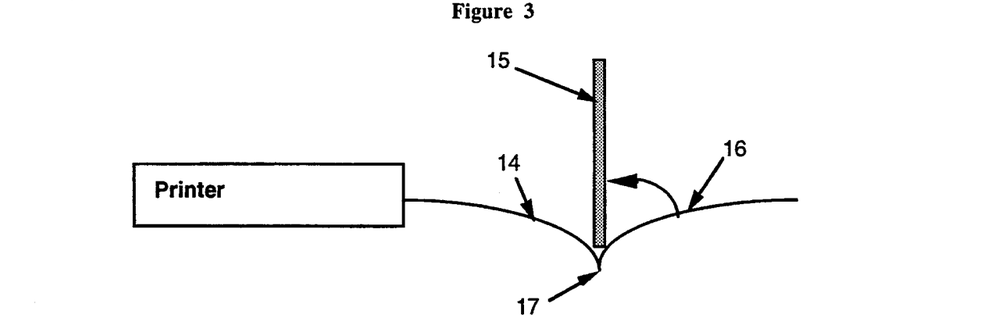
FIG. 3 illustrates the placement of the halfwave plate, used with transparent print media coming out of a printer and the folding of said media by the printer to form a hinge which places the SPVs in a proper relationship. Note one SPV is written as its mirror image to facilitate the folding of the media.

LC inks can be deposited by a number of methods. To illustrate, the microencapsulated CN-LC inks can be applied through conventional printing processes, silk-screening and ink jet deposition methods, although, it is primarily the ink jet method that is of interest for computer generated stereo hardcopy. The ink jet is also attractive for other reasons: it is frugal with the LC ink and it can be programmed with a printhead location system to have near perfect registration of multilayered printed inks, although for most applications this degree of registration appears to be unnecessary. The Wacker Chemie CCLC-S inks appear very well suited for use in the Phase Change Printers (PCP). Difficulty may arise from the need for the printer to easily handle both handednesses of ink, but if one of the SPVs is written on a transparent, nonbirefringent substrate, this problem can be eliminated by the addition of a halfwave plate placed between the SPVs. This is a very reasonable approach, since these printers are most often used to produce transparencies for "overhead" projector use, where the SPV could be printed such that they are naturally hinged together and the halfwave plate placed between them as shown in FIG. 3. This figure illustrates the placement of the halfwave plate (15) used with transparent print media coming out of a printer and the folding of said media by the printer to form a hinge (17) which places the SPVs (14 & 16) in the proper relation to one another. Note: SPV number 16 is written as a mirror image relative to the orientation of SPV number 14 in order to accommodate the folding of the media. One alternative to using the half wave plate is to place two sets of write heads within the printer, which is not easily done with the present day PCP hardware, nor is it a simple matter to change the write heads in these machines to heads having opposite handedness LC inks, as it is in some other ink jet printers. Another alternative, that could be very attractive in some circumstances, is to use two PCP printers, each using a different handedness of the CCLC-S inks.

Experiments with the CCLC-S inks indicate they can be printed on nearly any print media and the alignment of the LC structure can be assured by running a roller over the ink while at the activation temperature of the CCLC-S ink. If the ink is then fixed by a photo or thermal process, then a second layer of ink may be applied over the first, as can any desired filter inks. Thus to use the CCLC-S inks in a PCP printer, it appears that only a photo fixing process and some reprogramming of the write sequences would be required to the hardware, although it may also be necessary to introduce temperature control and cleaning of the roller used to align the CCLC-S ink. This is also where a computer controlled registration system could be important. In such a system the write head "looks" at the color just written by means of light sensors in the write head and the computer decides if the next color to be deposited should coincide with the last written area for that portion of the picture being printed.

Another application of the CCLC-S inks is in impact printers. In this case the aligned CCLC-S ink is placed upon the print ribbon where it can be cleanly transferred to the print media in a normal way. Provision must be provided in the printer for at least two ribbons or sections of a ribbon, one of each handedness, and most probably seven ribbons or sections of one or more ribbons, so that full color graphics can be printed. The CCLC-S inks could be fixed as the printing proceeds, at the end of each color/handedness printing or presumably when all the printing is complete, although it is expected that the print quality would suffer in the latter case. Another possibility is to have the CCLC-S inks not only aligned, but also set (made solid) on the ribbon, with some adhesive on it to aid in the transfer of the ink to the print media.

Figure 4:
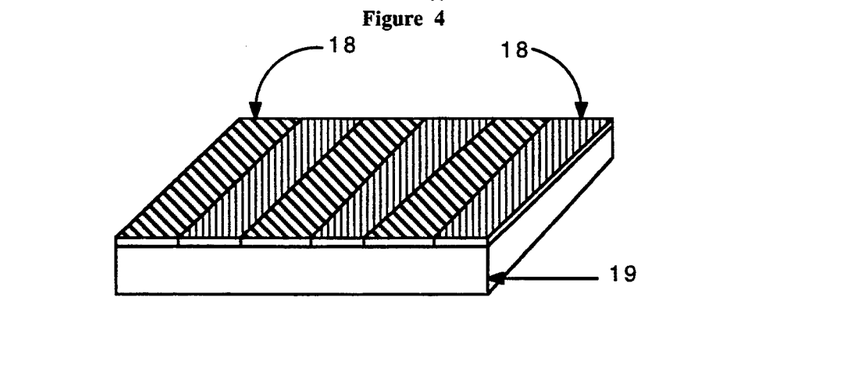
FIG. 4 illustrates an unwritten PEM. Polarizing stripes (18) of alternating handedness are printed adjacent to each other.
Figure 5:
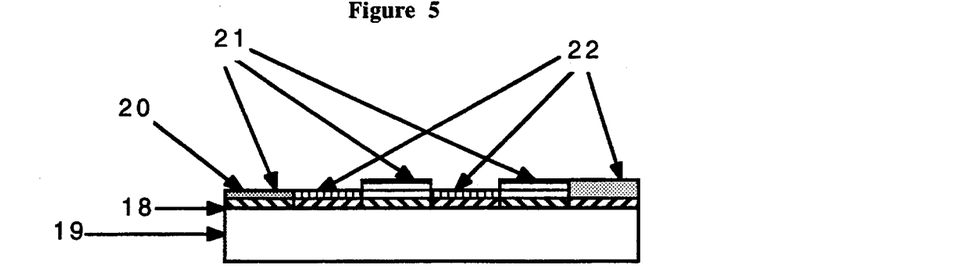
FIG. 5 illustrates a written PEM. Where transparent inks (20) are printed on the polarizing stripes (18) of FIG. 4. The SPVs (21 & 22) are printed in an interlaced manner.

An application for any of the CN-LC inks is in the fabrication of what has been called a Polarization Encoded Medium (PEM) in Disclosure Document Number 260862 filed with the U.S. Patent and Trademark Office on Aug. 16, 1990, cf. Ref's Venolia patent, U.S. Pat. No. 5,050,961 and Faris. In its simplest form, a PEM is a piece of print media containing an array of alternating handedness, polarizing stripes used to encode spatially distributed SPVs, which when viewed with polarization decoding glasses will direct the individual perspective views to the intended eye of the viewer (the stripes are referred to as tiles by Venolia and Faris calls them micro polarizers or micropols). In this embodiment of the invention a PEM can be fabricated by merely printing stripes with some or all the colors of LC inks, superimposed and having alternating handedness between adjacent polarizing stripes (18) on the print media (19), cf., FIG. 4. Then, when printed on a transparent medium, the PEM can be used to encode electsonic displays, e.g. LC, Plasma or Electroluminescent (EL) panels, for stereoscopic displays, following the teachings of Venolia. And in the hardcopy application, described by Faris, a SPV (21 & 22) is printed on each set of encoding stripes (18) having the same handedness and printed with conventional nonscattering transparency inks or waxes (20), cf., FIG. 5. In this way the polarization encoding function of the display is separated from the printing of the SPVs, but this comes at the expense of special print media and a sizeable loss of spatial resolution in the stereo hardcopy, plus the difficulty of printing each SPV on the polarizing stripes of specific handedness. The PEM can be used in either the reflective or transmissive display modes. For a transmissive display, a transparent medium will be used and light can be passed through the PEM in either direction (if a nonbirefringent medium is used), for either a direct view or projection display. In the reflective display mode, the print media will generally be black paper or transparent media set over a dark background.

For the laser printer application, sets of encoding CN-LC toners are required. It appears that this can be done using the CCLC-S material that has been oriented, fixed (made solid) and ground to a powder. These toners will simply replace the normal color toners in the laser printer, but it is expected that additional heating of the printer's roller is required to melt the LC toners and realign the LC to some degree. Microencapsulated CN-LC toners are also a possibility. It is anticipated that microcapsules employing a long chain molecule encapsulating medium such as E. I. Dupont's Elvanol ® HV will align the LC within them when passing through the standard heated roller of the laser printers. The CN-LC toners used in the laser printers may also be used in xerographic printing, in either stereoscopic or monoscopic applications.

As was noted earlier, the thermal wax and dye sublimation print processes are very wasteful of printing consumables and while it appears technically feasible to apply the methods of this patent to these printing technologies, these do not appear to be practical applications because of the waste and expense of the CN-LC inks.

Figure 6:
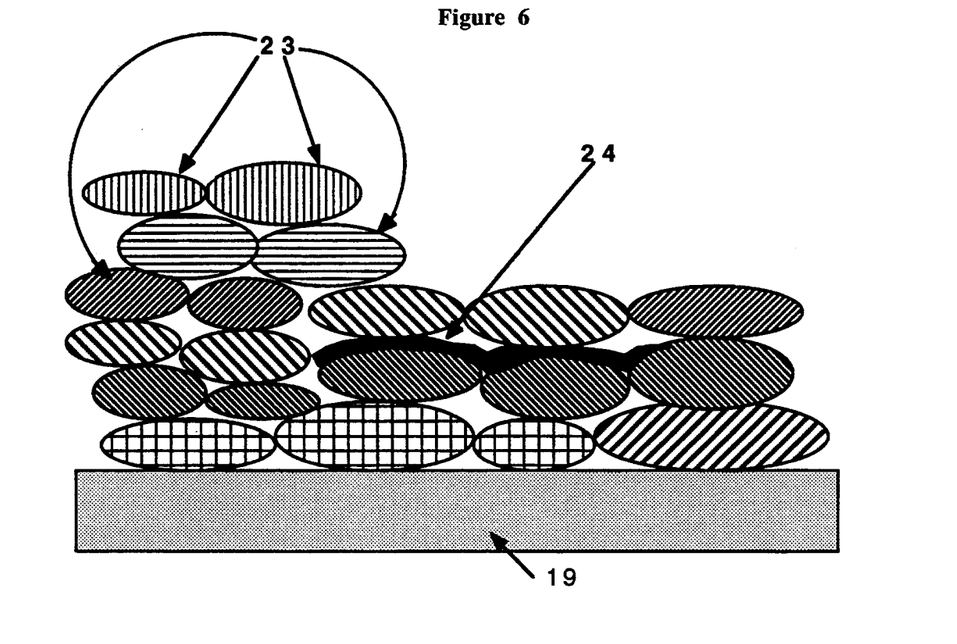
FIG. 6 illustrates in cross section, the placement of the microencapsulated LC inks or toners (23) and a neutral density filter (24) layer upon the print media (19).

A critical aspect of stereo printing is the thickness of the LC inks. The microencapsulated CN-LC inks will tend to have the greatest thickness, owing to the size of the microcapsules themselves. In FIG. 6 is shown a cross section of about three pixels (picture elements) printed with the microencapsulated CN-LC inks (23) of each handedness and a neutral density filter (24). Microcapsules of two to six microns appear well suited and one or two monolayers thickness per color seems to be ideal, since thicker ink layers tend to cause what is referred to as "ghosting", where the alternate eye will faintly see the intended eye's image. Thus far the microencapsulated CN-LC inks have been treated as merely microcapsules filled with CN-LC, and whereas this is true of the microencapsulated toners used with the laser printers, it is not true of the inks which also contains binders, dispersing agents and often volatile solvents, all of which are important to the ink's formulation.

Figure 7:
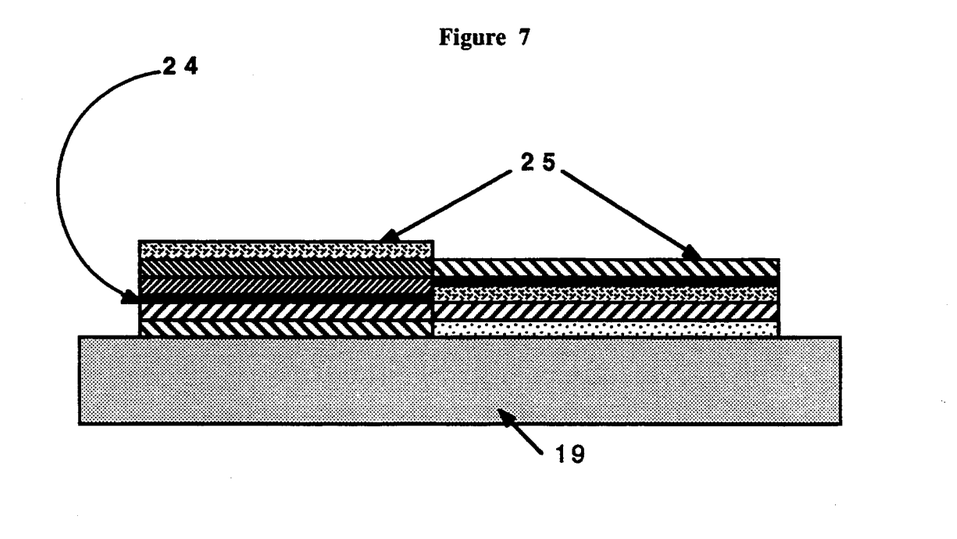
FIG. 7 illustrates in cross section, the placement of the CCLC-S inks or toners (25) and a neutral density filter (24) layer upon the print media (19).

FIG. 7 shows a cross section of two pixels printed with the Wacker Chemie CCLC-S ink (25) and a neutral density filter (24). These inks should also be applied very thin, down to a few pitch lengths of the LC structure, the thickness somewhat depending upon the smoothness of the surface upon which the ink is deposited. However, in photographic applications it is believed that thicknesses from this level to even less than the pitch length can be used to produce color halftones. And while this would also be advantageous in printing applications, the present day printers are incapable of ink thickness modulation, particularly in this regime of thicknesses. However, thicknesses of one to six microns appear to be easily achieved and quite acceptable, the thinner thicknesses are preferred since it is possible for the ink to become nearly as thick as the print media after six or seven layers of ink are applied. Also the cost of the hardcopy is chiefly the cost of the LC ink used to make the copy, so if the CCLC-S inks can be applied at the micron level, the LC ink costs would be inconsequential and the stereo hardcopy costs could be less than other color hardcopy costs. In the case of the CCLC-S ink on the impact printer ribbon, the ink can be applied at the thinnest levels, which should help assure good release of the ink from the ribbon. This is a process wherein all the ink under the impact hammer is transferred from the ribbon backing to the print media without disturbing the orientation of the LC.

There is also the expectation that these "inks" can be incorporated as the dyes in a photographic film process for stereoscopic presentations. One way which this can be done involves the use of color sensitive photolithographic type emulsions, although for reasonable color halftoning, these emulsions should be made very thin (estimated from 1 to 6 microns thick) compared to the normal photolithographic emulsions, which tend to be very thick (about 100 microns or more for the Vectograph Matrix Films). The film consists of three layers of these emulsions, each sensitive to a different band of visible light, having a sensitivity distribution much like the reflective color distribution of the LC inks of FIG. 1. A negative emulsion is used for the most simple and practical rendering of this process. For either a positive or negative emulsion, exposure to light causes a chemical change to occur in those emulsions sensitive to the colors of light used. The difference between positive and negative photolithographic emulsions is evident during development of the emulsions, at which time the positive emulsion will be diminished or be completely removed where it was exposed, whereas the negative emulsion will be entirely removed where it was not exposed and somewhat diminished in thickness where it was incompletely exposed. Thus with either the positive or negative photolithographic emulsion the picture is preserved in relief, although reversed between the two cases. In any case, after normal developing of the three film emulsions for each SPV, the emulsion layers are delaminated and any filters used in the film are discarded. Then, one can either pursue a direct or indirect application of the LC ink or dye. In either case, when negative emulsions are used, a LC ink is used that corresponds to the exposure color of the emulsion layer, i.e. the red sensitive emulsion layer would receive a LC ink that reflects red light of one handedness. The LC inks of preference are the CCLC-S inks from Wacker Chemie, the application of which is discussed in detail after the treatment of the film processing.

Figure 8:
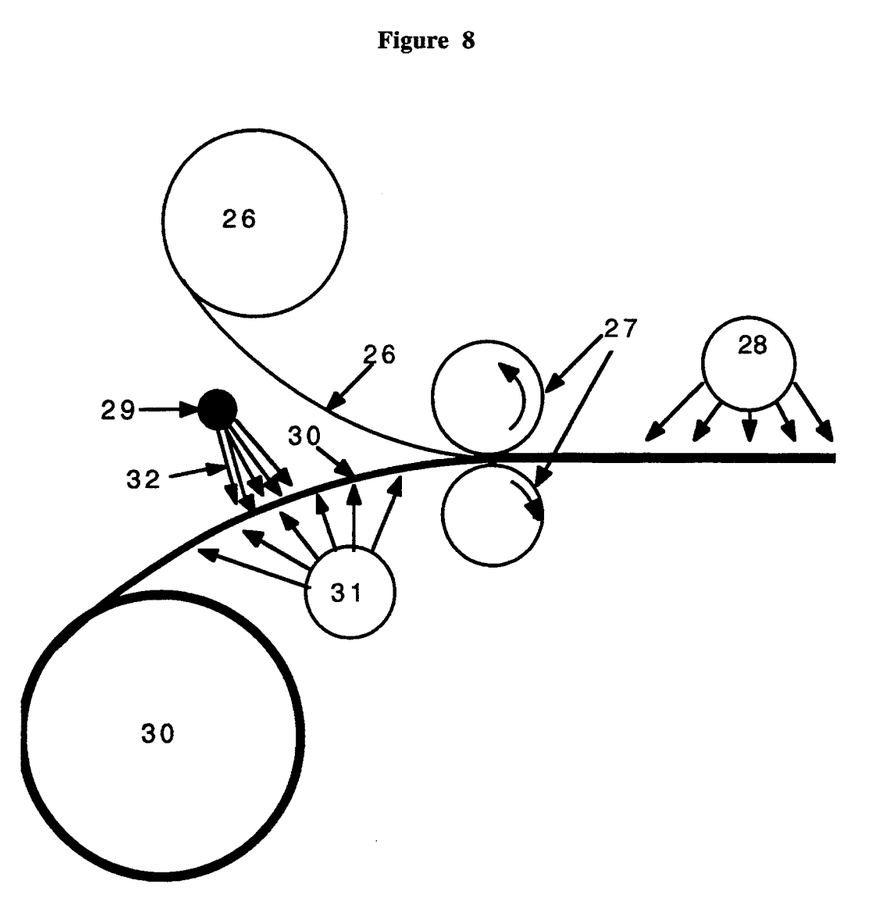
FIG. 8 illustrates the direct method of LC ink encoding photographic film with a coverlet being applied to the film layer.

There are both direct and indirect methods of processing the developed photolithographic film emulsion layers (3 per SPV) to make film suitable for stereo projection. The direct method of LC ink (32) encoding photographic film (30) with a coverlet (26) being applied to the film layer is illustrated in FIGS. 8 and 10. In this process developed photographic film (30) is heated by an IR or hot air source (31) and photo-setting LC ink or dye (32) is applied to the film (30) from a dispenser (29). The photographic film (30) together with a coverlet film (26), possibly having an alignment layer on it, is laminated together with rollers (27) and the LC ink (32) in the laminate is converted to the solid state by a UV light (28) which photo-sets the LC ink. UV light (28) could also be an IR light if thermal setting LC ink were used. The encoded film then goes to an optional emulsion removal process. If an alignment layer is used on the coverlet (26) or below in FIG. 9, on the transfer film (38), care should be taken that the direction of the alignment layer is complementary to the direction of the LC alignment stemming from the rolling or squeegee action.

Figure 9:
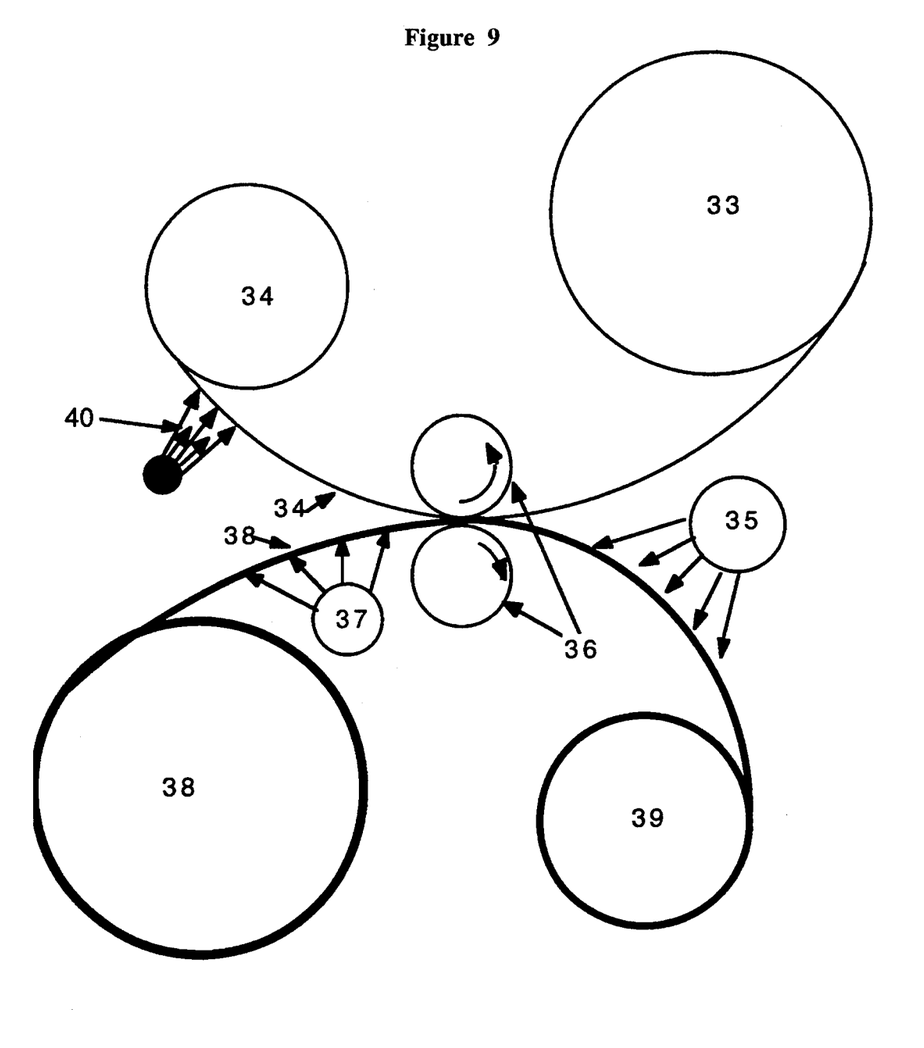
FIG. 9 illustrates the indirect method of LC ink encoding photographic film, with the LC ink predeposited on the transfer film.
Figure 10:
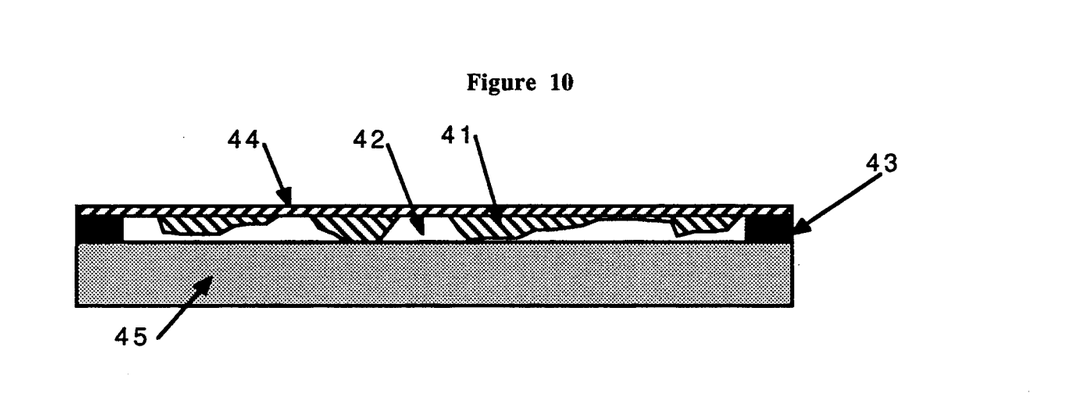
FIG. 10 illustrates the cross section of the product of the direct method (illustrated in FIG. 8) of LC ink encoding of photographic film.
Figure 11:
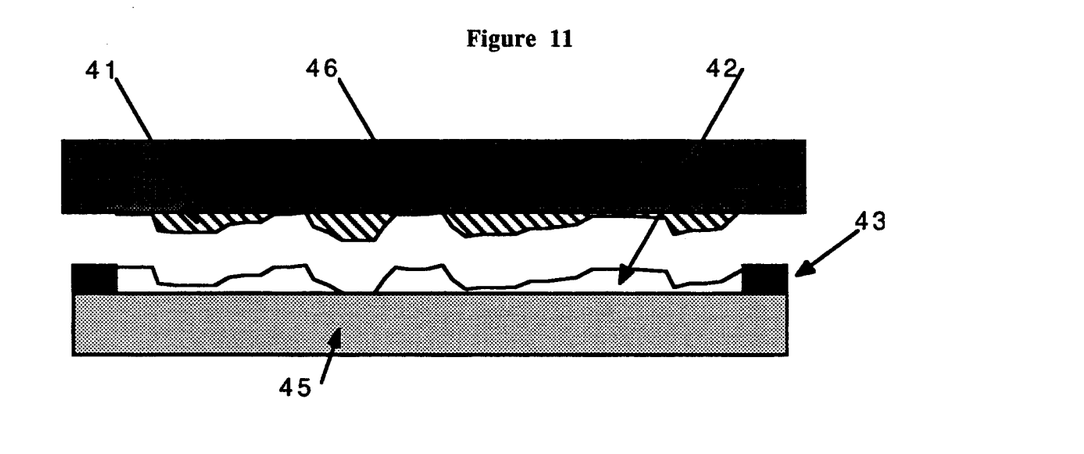
FIG. 11 illustrates the cross section of the product of the indirect method (illustrated in FIG. 9) of LC ink encoding of photographic film.

The indirect method of producing polarization and color encoded photographic film (39) with the LC ink predeposited on the transfer film (38) is illustrated in FIGS. 9 and 11. The process begins by applying and curing if necessary a release agent (40) (mould release) to the photoemulsion of the developed photolithographic film (34). Then the raw transfer film (38), having an optional alignment layer and a thin layer of either unactivated or activated CCLC-S ink predeposited on it (not shown) is heated by heat source (37) to soften and activate the LC ink which is then run through squeegee rollers (36) together with the developed photolithographic film (34), such that the emulsion is impressed in the LC ink layer of the transfer film (38). At this time (not shown) the UV light (35) can photo-set the LC ink layer or this may be done after the film layers are separated, as is shown. The photo film is then picked up on a spool (33) to possibly repeat the process, while the transfer film (39) is also spooled for later lamination with other emulsion layers. There are two minor variations of this indirect process, in one case the transfer film has a thin layer (1 or 6 microns thick) of the CCLC-S or other suitable LC ink, either activated or unactivated, predeposited on it, as was illustrated and in the other case the ink is applied as in the direct case (FIG. 8), just before the photo film and the transfer film go through squeegee rollers. In either case it might be noted that the process must be performed at the activation temperature of the CCLC-C inks (60 to 90 deg. C) and the excess ink accumulates at the rollers and is discarded at the edges of the film.

In comparing the direct and indirect encoding processes, the direct process seems to have an advantage in that the LC ink is reasonably well secured in place and in thickness until the LC ink can be photo-set with the UV light (28) as shown in FIG. 8. This is not the case for the indirect method where the photographic information is transferred to a second piece of film (Transfer Film) and then photo-set. In the indirect case to insure the quality of the pictorial and color information, the photo and transfer films may have to be held or pressed together until the photo-setting process is complete or nearly so. On the other hand, the direct process has two notable disadvantages in that the photographic films are consumed in the process and the developed emulsion may need to be removed at the end of the process.

The LC inks of preference are the CCLC-S inks from Wacker Chemie, which in the direct process of FIG. 8, can be hot (60 to 90 deg. C) rolled or squeegeed over the emulsion (42) in FIG. 10, showing a photographic film cross-section where the thickness of the LC ink (41) becomes an inverse function of the thickness of the developed photo-emulsion (42). This is also the case for the indirect process of FIG. 11, showing the introduction of a transfer film (46) and where the drawing code is the same as for FIG. 10, both drawings show an emulsion spacer (43), on a substrate (45), while FIG. 10 also shows the film coverlet (44). Experiments indicate that over a small range of LC ink thickness, the amount of reflected light will vary somewhat proportionally to the thickness of the LC ink layer, up to a thickness estimated at a few microns, where nearly all of the CPL of one handedness is reflected. Thus this process is able to yield color halftones in the picture.

Figure 12:
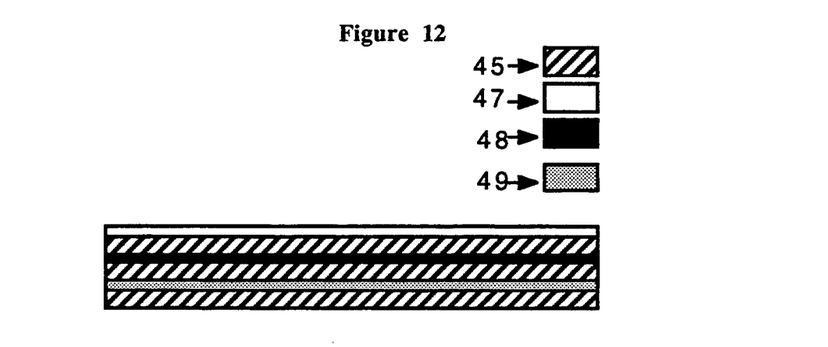
FIG. 12 illustrates the cross section of a recombined emulsion set of one SPV.

Once the color processing is completed for all three emulsion layers of each emulsion set, the film is reconstituted by laminating the individual emulsion layers together. In this process a laminating glue such as gelatin can be used to fill the color (LC ink) layers and seal the film layers together. But very exacting registration requirements must be met for the color layers of each SPV, so index holes or other alignment aids must be present in the film layers. FIG. 12 illustrates the laminated cross section of one such SPV. In this figure, the substrate (45) supports the ink layers (47, 48 & 49) which are not identified as to specific color, but generally the inks will be of one handedness and the transmitted colors of the layers will be cyan, magenta and yellow, while the reflected colors will be red, green and blue. This process is repeated with the film taken of a subject from a second source (camera) to obtain the two SPVs. The fill from one camera is developed with LC inks of one handedness and the film of the other camera is developed using the opposite handedness LC inks. These two films are then laminated together and the mixed images are projected together through a single projector, onto a metalized (polarization preserving) screen and viewed with the same type of circularly polarizing lenses used with the LC stereo hardcopy and stereo computer terminals.

A criticism that is often applied to stereo displays of all types is that they are very dim and/or have poor resolution. But since the CN-LC inks are very efficient in reflecting light of a specific color and they have virtually no effect on the light of other colors, they may be layered to achieve a large color gamut without any loss of resolution. These advantages can also find application in regular or monoscopic color printing, where CN-LC inks of both handedness can be used to produce very efficient color inks. The use of specular filters together with the use of one or both handedness of the ink can be used to yield color halftones, so that with suitable printing methods, photographic quality appears to be possible.

These and other embodiments can be practiced without departing from the true scope and spirit of the invention, which is defined by the following claims.

What is claimed is:

1. A full color stereoscopic hardcopy printing method, for presenting an image of a stereo pair of images encoded to each eye of a viewer so that the viewer can perceive a stereoscopic image, said method comprising:
   providing a first group of color inks that reflect circularly polarized light of one handedness,
   providing a second group of color inks that reflect circularly polarized light of handedness opposite said one handedness, and
   printing said stereo pair of images together in an intimately mixed or superimposed fashion to form a coextensive, composite image, employing the first group of color inks to print one of said stereo pair of images and the second group of color inks to print the other of said stereo pair of images, and thereby encoding the composite image to the viewer's eyes with circularly polarized light of orthogonal handednesses, so that when the composite image of the stereo pair of images is viewed with circularly polarizing decoding glasses, wherein the lenses of said glasses transmit to each eye only the image of the stereo pair of images encoded for that eye, the viewer perceives said color stereoscopic image.

2. A method according to claim 1, comprising printing the stereo pair of images with self-aligning chiral nematic-liquid crystal inks.

3. A method according to claim 1, comprising printing the stereo pair of images with chiral nematic-liquid crystal inks, and subsequently aligning the liquid crystal structure of said inks.

4. A method according to claim 1, wherein the step of printing at least one of the stereo pair of images includes depositing a specular filter.

5. A method according to claim 1, comprising printing the stereo pair of images on a transparent print medium and viewing the composite image in transmission, either directly or by means of projection onto a polarization preserving screen, thereby presenting to the viewer a color and handedness negative composite image of the reflected image, so that when said negative composite image is viewed with circularly polarizing decoding glasses, wherein the lenses of said glasses transmit to each eye only the image of the stereo pair of images encoded for that eye, the viewer perceives a full color stereoscopic image.

6. A method according to claim 1, comprising providing a print medium having a liquid crystal alignment surface or a liquid crystal alignment layer, and printing the stereo pair of images on the liquid crystal alignment surface or liquid crystal alignment layer.

7. A method of printing a full color stereoscopic image, comprising:
   printing one image of a stereo pair of images on a transparent substrate employing color inks that reflect circularly polarizing light of one handedness,
   printing the other image of said stereo pair of images on a second substrate employing color inks that reflect polarized light of the same said one handedness, and
   placing the transparent substrate over the second substrate with a halfwave plate interposed between the first and second substrates, so that when images on the two substrates are viewed from the side of the first substrate, the reflected circularly polarized light from the image on the second substrate, passing through the halfwave plate has its polarization encoding changed to circularly polarized light of the opposite handedness from said one handedness, whereas the circularly polarized light reflected from the image on the first substrate is unaltered, so that when the images of the stereo pair of images upon the two substrates are viewed with polarization decoding glasses, wherein the lenses of said glasses transmit to each eye only the image of the stereo pair of images encoded for that eye, the viewer perceives a color stereoscopic image.

8. A method according to claim 7, wherein the second substrate is also transparent, so that the transmitted circularly polarized light, of opposite handedness from said one handedness of the reflected circularly polarized light, from the image on the first substrate, passing through the halfwave plate has its polarization encoding changed to circularly polarized light of the one handedness, whereas the circularly polarized light transmitted by the image on the second substrate is unaltered, and the method comprises viewing the images of the stereo pair of images upon the two substrates with polarization decoding glasses, wherein the lenses of said glasses transmit to each eye only the image of the stereo pair of images encoded for that eye, whereby the viewer perceives a color stereoscopic image.

9. A method according to claim 7, wherein the first and second substrates are the front and rear surfaces of said halfwave plate.

10. A method according to claim 7, comprising printing the stereo pair of images with self-aligning chiral nematic-liquid crystal inks.

11. A method according to claim 7, comprising printing the stereo pair of images with chiral nematic-liquid crystal inks, and subsequently aligning the liquid crystal structure of said inks.

12. A method according to claim 7, wherein the step of printing at least one of the stereo pair of images includes depositing a specular filter.

13. A method according to claim 7, wherein at least one of the substrates has a liquid crystal alignment surface or a liquid crystal alignment layer, and the method comprises printing the image on the liquid crystal alignment surface or liquid crystal alignment layer employing chiral nematic liquid crystal inks.

14. A method of manufacturing a polarization encoded medium, comprising resolving a surface of a substrate into a linear array of area elements 0 ... n in one dimension, and depositing inks that reflect and transmit circularly polarized light at the ith area element (i=0 ... n), and wherein the inks that are deposited at each area element for which i is an odd number reflect light that is circularly polarized with one handedness and the inks that are deposited at each area element for which i is an even number reflect light that is circularly polarized with handedness opposite said one handedness and the circularly polarized light being transmitted by said area elements being of orthogonal handedness to that which is reflected by said area elements.

15. A method according to claim 14, wherein the linear array is expanded to a rectangular array by further resolving the surface of the substrate into area elements of 0 ... m in a second dimension that is orthogonal to said one dimension, and depositing inks that reflect and transmit circularly polarized light at the (i, j)th area element (i=0 ... n; j=0 ... m), and wherein the inks that are deposited at each area element for which i+j is an odd number reflects light that is circularly polarized with one handedness and the inks that are deposited at each area element for which i+j is an even number reflects light that is circularly polarized with handedness opposite said one handedness, and the circularly polarized light being transmitted by said area elements being of orthogonal handednesss to that which is reflected by said elements.

16. A method according to claim 14, comprising printing the area elements with self-aligning chiral nematic-liquid crystal inks.

17. A method according to claim 14, comprising printing the area elements with chiral nematic-liquid crystal inks and subsequentially aligning the LC structure of said inks.

18. A method according to claim 14, wherein the substrate has a liquid crystal alignment surface or a liquid crystal alignment layer, and the method comprises depositing chiral nematic liquid crystal inks on the alignment surface or alignment layer.

19. A method of creating a stereoscopic hardcopy from the images of a stereoscopic pair of images, comprising:
providing a polarization encoded medium having a linear or a rectangular array of area elements and in which the area elements are in first and second sets such that each area element of the first set is separated in at least one of the second and first dimensions of the array from other elements of the first set by at least one element of the second set and each element of the second set is separated from other elements of the second set by at least one element of the first set, and wherein the area elements of the first set transmit and reflect polarized light of one handedness or orientation and the area elements of the second set transmit and reflect polarized light of the opposite handedness or of orthogonal orientation, and
printing the left eye's stereo perspective view by depositing inks that transmit light of respective colors on the first set of area elements and printing the right eye's stereo perspective view by depositing inks that transmit light of respective colors on the second set of area elements, so that when viewed with polarization decoding glasses, wherein the lenses of said glasses transmit the polarization of the first set to the viewer's left eye and transmit the polarization of the second set to the viewer's right eye, a stereoscopic image is presented to the viewer.

20. A full color stereoscopic photographic film processing method, which presents a first and second image of a stereo pair of images to the left and right eyes of a viewer so that the viewer can perceive a stereoscopic image, comprising:
processing the individual emulsion layers of the photographic films of said first image of the stereo pair of images with polarizing dyes that reflect light of one color and one handedness of circularly polarized light,
processing said second image of the stereo pair of images with polarizing dyes that reflect light of one color and the opposite handedness of circularly polarized light, and
combining the color emulsion layers of each stereo pair of images to form a processed film of a first or second image of the stereo pair of images, which films of the first and second image when laminated together to form a coextensive, superimposed, composite image of the stereo pair of images, when viewed with circularly polarizing decoding glasses, wherein the lenses of said glasses transmit to each eye only the image of the stereo pair of images encoded for that eye, presents to the viewer said stereoscopic image.

21. A method according to claim 20, wherein at least one of the films has a liquid crystal alignment surface or a liquid crystal alignment layer and the method comprises depositing at least one layer of chiral nematic liquid crystal ink on the alignment surface or alignment layer.

22. A method of printing a color image, comprising depositing chiral nematic-liquid crystal inks to form an intimately mixed or superimposed, coextensive, composite image, the color components of said composite image being of either single or dual handedness, that reflect light of respective colors on a print receiving sheet.

23. A method according to claim 22, comprising depositing self-aligning chiral nematic-liquid crystal inks.

24. A method according to claim 22, comprising depositing chiral nematic-liquid crystal inks, and subsequently aligning the liquid crystal structures of said inks.

25. A method according to claim 22, further comprising the step of depositing a specular filter.

26. A method according to claim 22, wherein the print medium has a liquid crystal alignment surface or a liquid crystal alignment layer and the method comprises depositing at least one layer of chiral nematic liquid crystal ink on the alignment surface or alignment layer.

27. A full color stereoscopic hardcopy printing method, which presents an image of a stereo pair of images encoded to each eye of the viewer so that the viewer can perceive a stereoscopic image produced by printing said image of the stereo pair of images together in an intimately mixed or superimposed, coextensive, composite image on a transparent medium with color inks that transmit circularly polarized light of two orthogonal handednesses, one handedness of the polarized light for each image of the stereo pair of images, and thereby encoding the composite image to the viewer's eyes with circularly polarized light of orthogonal handednesses, when viewed directly or through projection.

28. A method according to claim 27, comprising printing the stereo pair of images with self-aligning chiral nematic liquid crystal inks.

29. A method according to claim 27, comprising printing the stereo pair of images with chiral nematic liquid crystal inks, and subsequently aligning the liquid crystal structure of said inks.

30. A method according to claim 27, wherein the step of printing at least one of the stereo pair of images includes depositing a specular filter.

31. A method according to claim 27, wherein the substrate or print medium has a liquid crystal alignment surface or a liquid crystal alignment layer, and the method comprises depositing one or more layers of chiral nematic liquid crystal inks on the alignment surface or alignment layer.

* * * * *